July 13, 1965 J. L. MARROTTE 3,193,944
MAGNETIC COMPASS FOR AIRCRAFT
Filed Aug. 24, 1962 4 Sheets-Sheet 2

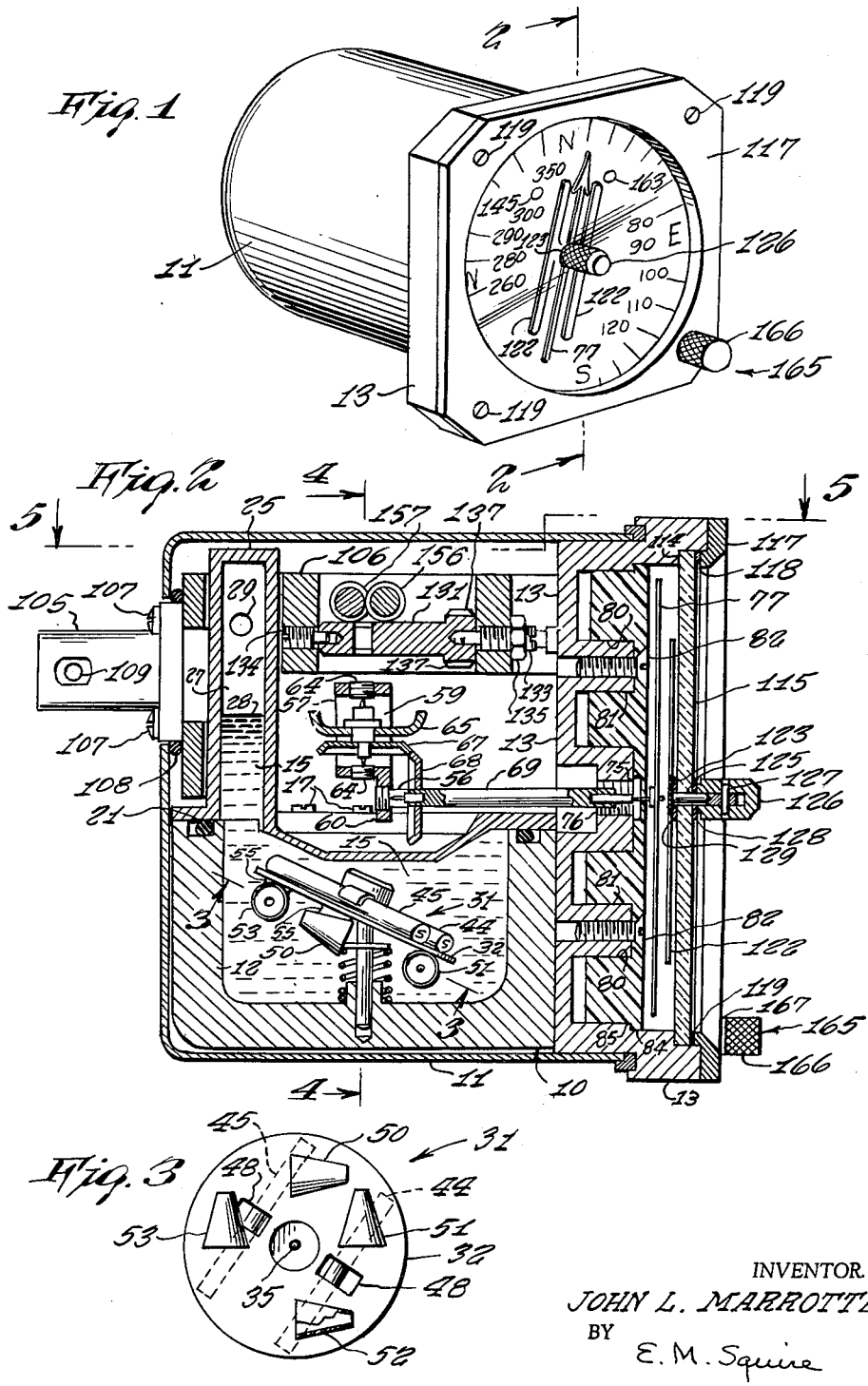

INVENTOR.
JOHN L. MARROTTE
BY E. M. Squire
ATTORNEY

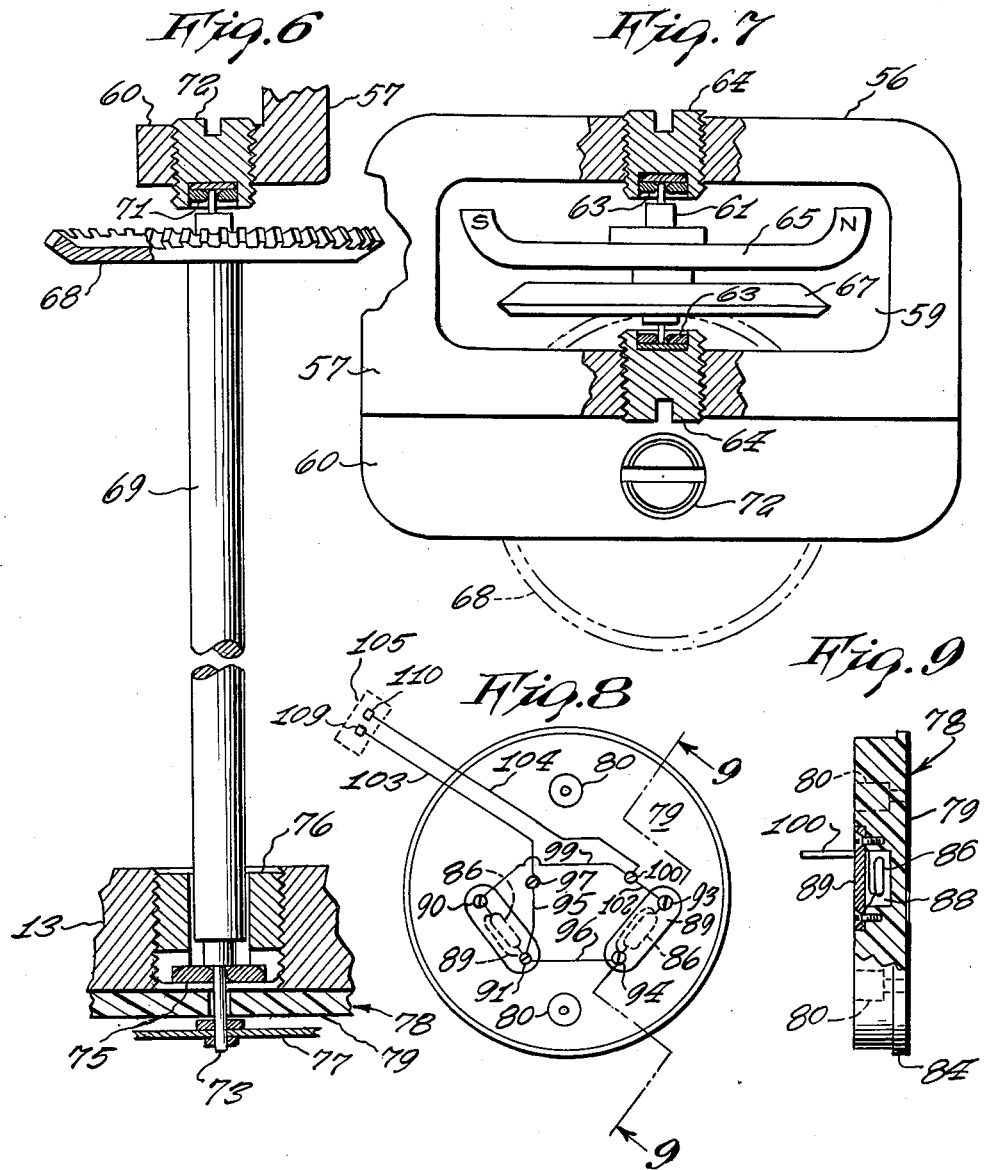

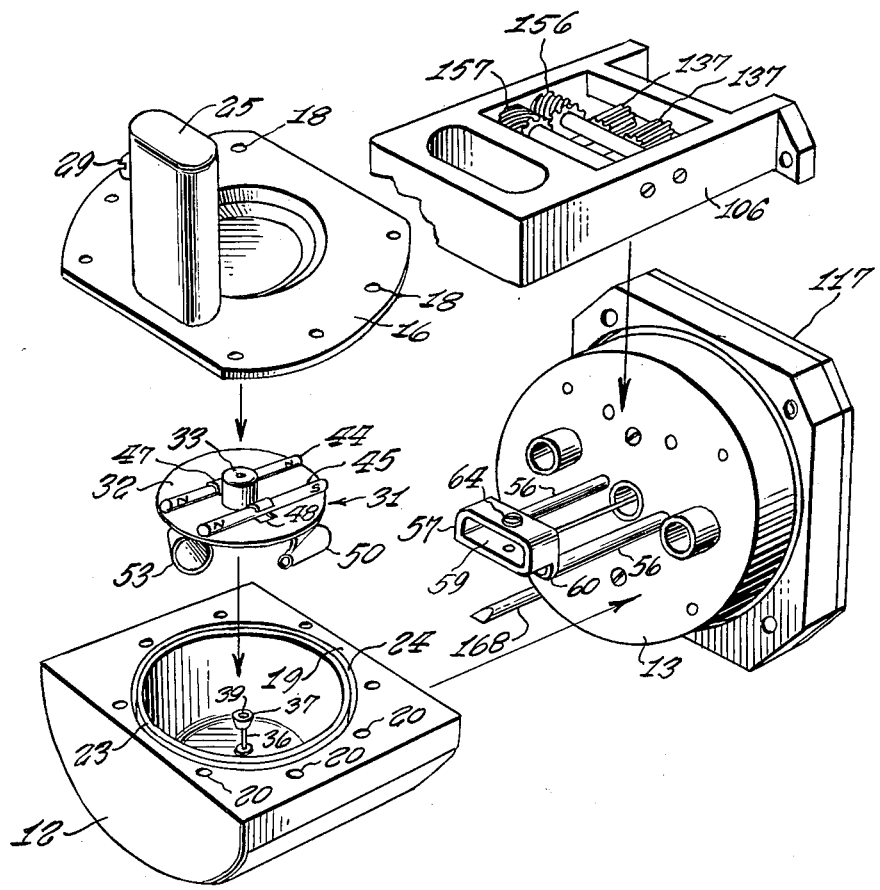
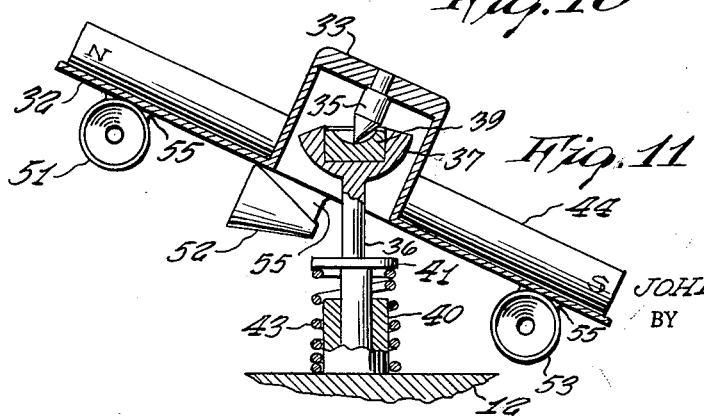

United States Patent Office 3,193,944
Patented July 13, 1965

3,193,944
MAGNETIC COMPASS FOR AIRCRAFT
John L. Marrotte, 84—60 259th St., Floral Park,
Queens, N.Y.
Filed Aug. 24, 1962, Ser. No. 219,193
6 Claims. (Cl. 33—223)

The present invention relates to magnetic compasses and more particularly to a magnetic compass having a flat circular dial arranged in a vertical plane, the compass being suitable for use as a navigational instrument in aircraft.

An object of the invention is to provide a compact compass which is light in weight and which is suitably damped for aircraft use.

A further object of the invention is the provision of a main magnet rotor which is solid and which cannot be collapsed by high pressure of the surrounding damping liquid which is frequently caused by high ambient temperatures.

Another object of the invention is to provide a compass of this type wherein access to the compensating magnet adjustment screws may not be obtained without first removing the front cover glass.

Still another object of the invention is the provision of a compass having a dial which is illuminated from the rear, the face of the dial being arranged to provide an even distribution of illumination.

Briefly, the compass comprises a body disposed within an enclosing case, the compass being suitable for mounting on the usual instrument panel of an airplane. A main magnet rotor is confined within a liquid-filled lower compartment or bowl portion of the instrument body. The main magnet, consisting of a pair of bar magnets, is mounted on the upper side of a solid, flat circular disc which is freely rotatably supported by a spring cushioned jewel bearing. A group of hydraulic damping elements is mounted on the lower side of the main magnet rotor disc. An auxiliary magnet is mounted above the main magnet for orientation thereby and drives the indicating pointer through a pair of bevel gears. The adjustable compensating magnets are mounted above the auxiliary magnet. The pointer cooperates with a dial which is provided with rear illumination.

Various additional objects, features, and advantages of the invention will become apparent upon reading the following specifications with reference to the accompanying drawing forming a part hereof.

Referring to the drawing:

FIGURE 1 is a perspective view of a magnetic compass embodying the invention.

FIGURE 2 is an enlarged side elevational view in longitudinal section taken along the line 2—2 of FIG. 1 looking in the direction of the arrows.

FIGURE 3 is a bottom view of the main magnet rotor looking on the line 3—3 of FIG. 2 in the direction of the arrows.

FIGURE 6 is an enlarged fragmentary view showing the drive shaft for the indicating needle.

FIGURE 7 is an enlarged fragmentary view showing the auxiliary magnet and its supporting structure partly broken away to illustrate details of construction.

FIGURE 8 is a rear view of the illuminated dial member showing the lamps and their connections which illuminate the dial indicia from the rear.

FIGURE 9 is a side view of the dial member, partly broken away and shown in section taken along the line 9—9 of FIG. 8.

FIGURE 10 is an exploded perspective view showing the major portions of the instrument.

FIGURE 11 is an enlarged side view in axial section showing the main magnet rotor.

Figure 4:
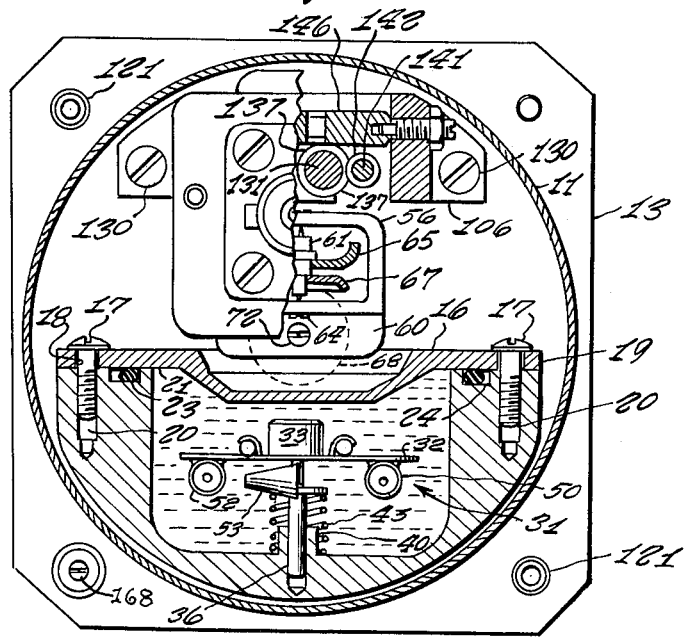
FIGURE 4 is a transverse sectional view taken along the line 4—4 of FIG. 2, looking toward the front of the instrument.

The instrument comprises a body structure designated generally as 10 (FIG. 2) which is enclosed within a cylindrical outer cover 11. The body structure 10 comprises a lower rotor bowl portion 12 which is suitably secured to a vertical front mounting member 13. The bowl portion 12 is filled with a damping fluid shown as oil 15. The bowl 12 is covered by a closure member 16. Closure member 16 is removably secured to the top of bowl 12 by screws 17 which extend downwardly through holes 18 and the flat upper peripheral surface 19 of the bowl portion 12 into threaded engagement with tapped holes 20 formed in the side wall of bowl 12.

The closure member 16 is provided with a flat annular lower surface 21 which cooperates with the confronting flat annular upper surface 19 of the bowl 12 to form an oil-tight receptacle. Sealing is provided by a resilient gasket 23 of the O-ring type which is retained in an annular groove 24 formed in the upper surface 19 of the bowl 12. The bowl closure member 16 is provided with an integrally formed upwardly extending hollow portion 25 defining an expansion chamber 27 above the upper surface of the damping oil 15. A screw-type filling plug 29, threaded into the wall of the hollow portion 25, is provided for emptying or replenishing the damping oil 15.

The main magnet rotor, designated generally as 31 is rotatably supported in the oil-filled bowl 12 and comprises a flat circular disc 32 with an upwardly projecting inverted bearing cup 33 fixed at its center. Within the bearing cup 33 a downwardly conically convergent pivot point member 35 is centrally fixedly secured. A freely vertically slidable pivot support member 36 has an enlarged head 37 at its upper end. A pivot jewel 39 is fixedly secured in the head 37 and is provided with a cup-shaped upper surface which receives the point of pivot member 35 to provide a substantially frictionless jeweled bearing for the rotor 31. The bottom of the bowl 12 has a centrally located upwardly directed integrally formed boss 40 which is drilled to support the pivot support member 36 freely slidably therein. The pivot support member 36 is provided with a laterally extending annular flange portion 41. A helical compression spring 43 extends between the flange 41 and the bottom of the bowl 12. The lower end of the spring 43 surrounds and is guided by the boss 40. The spring 43 serves as a cushion spring to protect the jeweled bearing 35, 39 from the effects of vibration during operation of the aircraft in which the compass is used.

The main magnet consists of two parallel bar magnets 44 and 45 mounted on the rotor disc 32. The magnetic fields of the magnets 44 and 45 are oriented parallel to each other with the same direction of polarity. The pair of magnets 44, 45 is symmetrically arranged with respect to the point of the pivot pin 35 so that the center of gravity of the rotor 31, taken as a unit, lies on the rotational axis of rotor 31 determined by the jeweled bearing 35, 39 and below the point of the pivot pin 35. The magnet 44 is secured to the upper surface of disc 31 by soldering to a clip 47. The magnet 45 is similarly secured to a clip 48.

Beneath the disc 32 a group of four hydrokinetic damping elements 50–53 is provided. Each element 50–53 is formed as a hollow frustum of a cone open at both ends. The axes of all of the elements 50–53 lie in a common plane located below the disc 32, the plane being normal to the rotational axis of the rotor 31. As shown, the axes of all of the elements 50–53 are tangent to a common circle concentric with the rotational axis of rotor 31. The elements 50–53 are regularly arranged beneath the disc 32 being secured thereto by soldering, as at points 55, for example. Diametrically opposed damping elements 50 and 52 are oriented with their larger bases facing in opposite directions of rotation and diametrically opposed elements 51 and 53 are similarly oriented in opposite rotational directions. Each of the elements 50–53 operates in the oil 15 in the manner of a "sea anchor." Strong resistance to movement through the oil 15 is developed when any element is moved through the oil with the large end first. Only comparatively minor drag resistance is developed against movement in the opposite direction. As shown in the drawing, the elements 50 and 53 will resist rotation of the rotor 31 (counter-clockwise in FIG. 10). The elements 51 and 52 will resist rotation in the opposite direction. The resistance of elements 50–53 is dynamic, only. When the speed of rotation of the rotor 31 apprches zero, the resistance offered by the damping elements 50–53 likewise approaches zero, there being no resistance when the rotor 31 is stationary. For better balance, where the number of braking elements is a multiple of four, diametrically opposed pairs of elements may be oriented to oppose rotation in one direction only, another diametrically opposed pair being arranged to oppose rotation in the opposite direction. Such an arrangement may be provided by reversal of elements 52 and 53, for example. Elements 51 and 53 would then simultaneously resist clockwise rotation, as viewed in FIG. 3, and diametrically opposed elements 50 and 52 would resist counterclockwise rotation, the major resistive forces in either direction consisting of a couple with its center at the rotational axis of the rotor.

Two fixed supporting rods 56 extend rearwardly from the front mounting member 13 of the body structure 10. A bearing carrying frame member 57 is fixed to rear ends of the supporting rods 56 so that it is rigidly spaced behind the front mounting member 13 of the body structure 10. The frame member 57 defines a horizontally elongated aperture 59. An integrally formed bearing supporting lip 60 depends from the bottom of the frame member 57. A vertical shaft 61 is journaled in ring jewels 63 (FIG. 7) fixed in adjustable mounting screws 64. An auxiliary magnet 65 is fixed on the shaft 61. The auxiliary magnet 65 is a bar magnet which is centrally substantially frictionlessly pivoted by its supporting shaft 61 and jewel bearings 63, 64. The ends of the auxiliary magnet 65 are upwardly directed toward the compensating magnets, later to be described. A driving bevel gear 67 is fixed to the vertical pivot shaft 61 along with the auxiliary magnet 65. The driving bevel gear 67 is in continuous meshing engagement with a driven bevel gear 68 fast on a pointer shaft 69.

The end of the pointer shaft 69 adjacent to the bevel gear 68 is journaled in a ring jewel 71 (FIG. 6) fixed in an adjustable mounting screw 72 threadedly secured in the depending lip 60. At its front end, the pointer shaft 69 comprises a reduced diameter portion 73 which is journaled in a ring jewel 75 fixed in an adjustable mounting screw 76 threadedly secured in the front mounting member 13 of the instrument body 10. A directional pointer 77 is fixed on the reduced diameter portion 73 of pointer shaft 69 for rotation therewith.

A dial member designated generally as 78 carries a photographically imprinted dial face 79 on its front surface, the dial member 78 being formed of transparent plastic material. The dial member is provided with cylindrical recesses 80 which fit over forwardly projecting vertically spaced bosses 81 integrally formed on the front mounting member 13. The bosses 81 are axially tapped to received flat headed mounting screws 82 which secure the dial member 78 to the front mounting member 13. The dial member 78 is provided with an integrally formed annular lip portion 84 which seats against a circular shoulder 85 formed on the mounting member 13.

For illumination of the photographically imprinted dial face 79, two "grain of wheat" type lamps 86 (FIGS. 8 and 9) are provided. The lamps 86 are mounted in symmetrically arranged elongated recesses 88 formed in the dial member 78. Each lamp recess 88 is closed by an individual cover plate 89 formed of electrically insulative material. Each cover plate 89 is set flush with the rear surface of the dial member 78. One of the cover plates 89 is secured to the back of the dial member 78 by screws 90 and 91 which also serve as terminals for the lead wires of one of the lamps 86. The other cover plate 89 is similarly secured by screws 93 and 94.

The screws 91 and 94 are interconnected by a conductor 96. A further conductor 95 extends from screw 91 to a first terminal post 97. A conductor 99 connects the screw 90 to a second terminal post 100. A further conductor 102 connects the screw 93 to the terminal post 100. Conductors 103 and 104 extend from the terminal posts 97 and 100 to a connector 105 mounted at the rear of the compensating magnet supporting bracket 106 by screws 107. An O-ring gasket 108 surrounds the base of the connector 105 for sealing engagement with rear wall of the outer cover 11. The connector 105 comprises two laterally protruding contact members 109 and 110 which are connected to the conductors 103 and 104, respectively, and are adapted for engagement with cooperating contact members (not shown) carried by a removable connector member, the cooperating contact members being energized by the current supply for the lamps 86.

The mounting member 13 is provided with an annular shoulder 114 (FIG. 2) which serves as a seat for the edge of a circular cover glass 115. The glass 115 is held in place by a front bezel plate 117, a felt gasket 118 being interposed between the glass 115 and the annular inwardly extending lip portion 119 of the bezel plate 117. The bezel plate 117 is secured to the mounting unit 13 by screws 119. Two tapped holes 121 (FIG. 4) are provided in the rear surface of the mounting member 13 for securing the compass to the instrument panel of an aircraft.

A manually adjustable course indicator is mounted on the rear of the cover glass 115 and comprises a pair of parallel needles 122 interconnected by an integrally formed crossbar member 123. The center of the crossbar member 123 is fixed to a shaft 125 which extends freely rotatably through the cover glass 115. A knurled adjustment knob 126 is fixedly secured to the front end of the shaft 125 by a pin 127. A friction spring washer 128 is interposed between the cover glass 115 and the knob 126. A similar washer 129 is interposed between the crossbar member 123 and the cover glass 115. The washers 128 and 129 frictionally hold the parallel needles 122 in any desired position of angular adjustment to which they have been turned by rotation of the knob 126.

Figure 5:
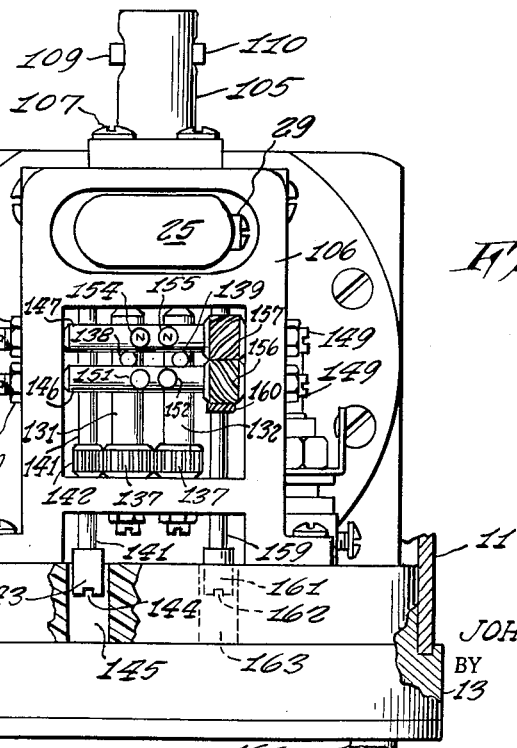
FIGURE 5 is a top plan view taken along the line 5—5 of FIG. 2, partly broken away to illustrate details of construction.

The compensating unit comprises a frame or bracket 106 which is secured to the mounting member 13 by screws 130. A pair of shafts 131 and 132 extend forwardly and rearwardly in the frame 106. The shafts 131 and 132 are mounted for rotation about their parallel longitudinal axes on front and rear bearing screws 133 and 134, respectively. The front bearing screws 133 are provided with lock-nuts 135. The parallel shafts 131 and 132 have continuously meshing pinions 137 integrally formed thereon near their front ends. The shafts 131 and 132 always rotate in opposite directions with equal angular displacements. A small cylindrical compensating magnet 138 formed of an alloy of high coercive force extends transversely of the shaft 131. A similar permanent magnet 139 is mounted in the shaft 132. The axes of the permanent magnets 138 and 139 lie in a common plane which is perpendicular to the rotational axes of the shafts 131 and 132. The centers of the magnets 138 and 139 lie on the rotational axes of the shafts 131 and 132, respectively. The magnets 138 and 139 are so arranged that their axes are parallel, as shown in FIG. 5 with the north poles of both magnets facing upwardly. By rotation of the two magnets 138 and 139 through 90°, the north poles will be caused to confront each other and the axes of the two magnets will be aligned. Rotation of the shafts 131 and 132 through 90° in the opposite direction will cause the two south poles of magnets 138 and 139 to confront each other.

An adjustment shaft 141 is journaled in the bracket 106 and extends parallel to the shafts 131 and 132. The adjustment shaft 141 is provided with an integrally formed pinion 142 which is in continuous meshing engagement with the pinion 137 on the shaft 131. The front end of the shaft 141 is headed at 143. The headed portion 143 is provided with a transversely extending screwdriver slot 144 (FIG. 5) which is accessible through a small circular aperture 145 (FIG. 1) formed in the dial member 78. The shafts 131 and 132 are frictionally held against rotation from the desired position of adjustment by adjustment of the bearing screws 133 and 134. Friction spring washers like washers 128 and 129 may be provided, if desired.

Another pair of parallel shafts 146 and 147 extends transversely of the bracket 106. The shafts 146 and 147 are journaled on four bearing screws 149 each of which is provided with a lock-nut 150. A pair of spaced permanent magnets 151 and 152 is mounted near the center of the shaft 146. In FIG. 5, the north poles of both magnets 151 and 152 are shown facing upwardly. A similar pair of permanent magnets 154 and 155 is mounted in the shaft 147. The shafts 146 and 147 are constrained to rotate through equal angular displacements in opposite directions by integrally formed spiral gears 156 and 157 which are in continuous meshing engagement with each other. The upper shafts 146 and 147 are frictionally held against rotation like shafts 131 and 132. Two magnets are used in each of the upper shafts 146 and 147 instead of a single magnet as in the lower shafts 131 and 132 because the upper shafts 146 and 147 are more remote from the auxiliary magnet 65 than the lower shafts 146 and 147. Accordingly, a stronger compensating field is needed for the upper shafts than for the lower shafts.

A forwardly and rearwardly extending adjustment shaft 159 is journaled for rotation about its longitudinal axis. A sprial gear 160 formed on the adjustment shaft 159 is in continuous meshing engagement with the spiral gear 156 on the transversely extending upper shaft 146. The front end of the adjustment shaft 159 is headed at 161. The headed portion 161 is provided with a transversely extending screwdriver slot 162 similar to slot 144 which is accessible through a small circular aperture 163 formed in the dial member 78 to the right (as viewed in FIG. 1) of the other aperture 145.

When adjusting the compensating magnets, a nonmagnetic screwdriver must be used. Moreover, the screwdriver must be dimensioned for engagement with the screwdriver slots 144 and 162 through the apertures 145 and 163 after removal fo the bezel plate 117 and cover glass 115. Because small non-magnetic screwdrivers are not generally available, a suitable screwdriver designated generally as 165 is removably secured in the mounting member 13. The screwdriver 165 is formed of brass and comprises a knurled handle portion 166. Adjacent to the handle 166, the shank of the screwdriver 165 is threaded for engagement in the mounting member 13 and is provided with a friction spring washer 167 to prevent loosening under vibration. The screwdriver 165 also comprises an integrally formed blade 168. The blade 168 is shaped for entry into either aperture 145 or 163 to engage screwdriver slot 144 or 162.

By turning adjustment shaft 141 using slot 144, a compensating field may be produced which extends transversely across the instrument. The magnitude of this field may be varied from a maximum with one polarity through zero to a maximum with the opposite polarity. Similarly, a forwardly and rearwardly extending compensating field may be produced by turning shaft 159 using screwdriver slot 162. The two compensating fields are mutually perpendicular.

By varying the individual magnitude and polarity of each of the two mutually perpendicular fields, a resultant compensating field can be produced which is oriented in any desired direction, the magnitude of the resultant field being limited by the strength of the compensating magnets.

The arrangement of the adjustment apertures 145 and 163 is such that inadvertent changes in the positions of the compensating magnets is prevented. Before any change in adjustment can be made, the cover glass 115 must first be removed. This also tends to prevent tampering by unauthorized persons.

While I have shown what I believe to be the best embodiment of my invention, it will be apparent to those skilled in the art that various changes and modifications may be made therein without departing from the spirit and scope of the invention as defined in the appended claims.

What is claimed is:

1. A main magnet unit for a magnetic compass, comprising, in combination: a rotor member; bearing means supporting said rotor member for substantially frictionless rotation in a horizontal plane; magnet means adapted for orientation by the earth's magnetic field, said magnet means being carried by said rotor member with its center of gravity located on the rotational axis of said rotor member; a quantity of a damping fluid surrounding said rotor member; and a plurality of asymmetrically effective damping members carried by said rotor member and immersed in said fluid, a first one of said damping members opposing rotation of said rotor to a greater extent on one direction than in the opposite direction and a second one of said damping members opposing said rotation to a greater extent in said opposite direction than in said one direction.

2. A main magnet unit according to claim 1, wherein each damping member is of hollow frusto-conical configuration open at both ends, the longitudinal axis of each frusto-conical member being perpendicular to said rotational axis, the larger end of the first damping member opposing rotation in said one direction and the larger end of the second damping member opposing rotation in said opposite direction.

3. A main magnet unit according to claim 2, wherein said rotor member is a flat solid circular disc formed of non-magnetic material, and in which said magnet means comprises a pair of parallel bar magnets fixed to said disc.

4. A damped magnet unit for use in a magnetic compass, comprising: a bowl member; a removable cover member for said bowl member; said cover member and bowl member together defining a gas-tight main chamber; a damping liquid contained within said main chamber; a magnet member within said main chamber and immersed in said liquid, said magnet member being formed of solid elements unaffected by increases in the pressure of said damping liquid; substantially frictionless bearing means in said main chamber supporting said magnet member for rotation about a normally vertical axis; and hydrokinetic damping means carried by said magnet member and immersed in said liquid, said damping means comprising a plurality of asymmetrically operative damping elements each of which opposes rotation of said magnet member only during movement thereof and to a greater extent for one direction of rotation than for the opposite direction, said damping elements being oppositely oriented to oppose rotation collectively to the substantially same extent in either direction.

5. A magnet according to claim 4, further comprising means communicating with said main chamber and defining an expansion chamber for said liquid.

6. A magnet according to claim 4, wherein each of said damping elements is a hollow frusto-conical member open at both ends, said frusto-conical members being secured to said magnet member with their axes in a common plane perpendicular to said normally vertical axis and tangent to a circle lying in said plane and concentric with said axis, the center of gravity of said magnet member and said damping elements, considered as a unit, lying on said axis.

References Cited by the Examiner

UNITED STATES PATENTS

| | | | | |
|---|---|---|---|---|
| 251,284 | 12/81 | Raine | 58—53 |
| 780,374 | 1/17 | Negus et al. | 33—225 |
| 1,925,863 | 9/33 | Crocker | 33—225 |
| 2,087,086 | 7/37 | De Beeson | 33—223 X |
| 2,224,732 | 12/40 | Kollsman | 33—223 |
| 2,294,990 | 9/42 | Kollsman | 33—223 |
| 2,359,691 | 10/44 | Tillander | 33—222 |
| 2,417,864 | 3/47 | Dinsmore | 33—225 |
| 2,687,577 | 8/54 | Pallotti | 333—222 |

FOREIGN PATENTS

| | | |
|---|---|---|
| 794,813 | 12/35 | France. |
| 225,422 | 9/10 | Germany. |

ISAAC LISANN, *Primary Examiner.*